(12) United States Patent
Ino et al.

(10) Patent No.: US 6,378,491 B1
(45) Date of Patent: Apr. 30, 2002

(54) SUCTION APPARATUS FOR AN INTERNAL COMBUSTION ENGINE

(75) Inventors: Masao Ino, Toyota; Katsuya Torii; Yuichiro Miura, both of Anjo, all of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/618,799

(22) Filed: Jul. 18, 2000

(30) Foreign Application Priority Data

Jul. 22, 1999 (JP) ............................................. 11-207669
Mar. 13, 2000 (JP) ........................................ 2000-068733

(51) Int. Cl.$^7$ ................................................. F02M 9/16
(52) U.S. Cl. ................ 123/337; 123/195 C; 123/90.38; 123/142.5 R
(58) Field of Search ............................ 123/337, 195 C, 123/90.38, 184.22, 142.5 R

(56) References Cited

U.S. PATENT DOCUMENTS 4,722,307 A * 2/1988 Okuno et al. ............. 123/90.38
5,704,335 A * 1/1998 Akutagawa et al. ......... 123/337
6,095,105 A * 8/2000 Lohr et al. ................ 123/90.38

FOREIGN PATENT DOCUMENTS

| DE | 41 22 138 C | 8/1992 |
| JP | 3-17241 | 2/1991 |
| JP | 3-17242 | 2/1991 |
| JP | 4-119337 | 10/1992 |
| JP | 4-119338 | 10/1992 |
| JP | 4-119352 | 10/1992 |
| JP | 6-117328 | 4/1994 |
| JP | 8-135506 | 5/1996 |

OTHER PUBLICATIONS

Patent Abstracts of Japan, vol. 009, No. 202 (M–405), Aug. 20, 1985 & JP 60 065265 A (Nissan Motor Co.), Apr. 15, 1985.
Patent Abstracts of Japan, vol. 1995, No. 06, Jul. 31, 1995 & JP 07 077108 A (Mikuni Corp.), Mar. 20, 1995.

* cited by examiner

Primary Examiner—Erick Solis
(74) Attorney, Agent, or Firm—Nixon & Vanderhye PC

(57) ABSTRACT

A hollow-cylindrical heat conduction portion is formed on a throttle body in such a way as to protrude outwardly therefrom in the radial direction. The throttle body and the heat conduction portion are integrally formed using metal material such as aluminum having excellent heat conductivity or resin material containing such a metal material. A vent hole communicating the interior with the exterior of a head cover is formed in the head cover. Through the vent hole there is inserted the heat conduction portion, and the clearance between an outer-peripheral wall thereof and an inner wall of the vent hole is sealed by means of a seal member.

11 Claims, 7 Drawing Sheets

SUCTION APPARATUS FOR AN INTERNAL COMBUSTION ENGINE

CROSS-REFERENCE TO RELATED APPLICATION

The present invention is related to Japanese patent application No. Hei. 11-207669, filed Jul. 22, 1999; No. 2000-68733, filed Mar. 13, 2000, the contents of which are incorporated herein by reference.

FIELD OF THE INVENTION

The present invention relates generally to a suction apparatus for an internal combustion engine, and more particularly, to a suction apparatus for an internal combustion engine.

BACKGROUND OF THE INVENTION

Conventionally, there is known a technique for preventing operational defects due to freezing of a throttle body of an internal combustion engine. In such techniques, generally, a warm water passage is provided for circulating engine-cooling water in the vicinity of a suction passage in the throttle body. The cooling water heated by the engine flows through that warm water passage, thereby heating the throttle body and preventing the throttle body from freezing.

For example, according to the throttle body disclosed in JP-A-8-135506, by shaping a partition wall (used for partitioning a suction passage from a warm water passage) as a thin wall and reinforcing this partition wall with a rib, the heat conduction efficiency of the throttle body is increased, thereby preventing freezing.

Also, JP-A-6-117328 provides a throttle body having no such warm water passage. Here, a throttle body and a cylinder block are connected to each other by a heat pipe. Latent heat from an operational liquid filled within the heat pipe is utilized to conduct heat from the cylinder block and prevent freezing of the throttle body.

However, in the throttle body according to JP-A-8-135506, piping must be used for guiding the engine-cooling water into the throttle body and circulating the engine-cooling water so that the engine-cooling water returns to an engine main body via the throttle body. This type of piping necessitates the use of a complex structure for conducting a large amount of heat from the engine main body to the throttle body. Accordingly, the space needed for installing the throttle body is large. Also, this design has increased weight, complex assembly, and increased manufacturing cost.

On the other hand, in JP-A-6-117328, the end portion of the heat-radiating side of the heat pipe must be raised higher than the end portion of a heat input side. Moreover, the heat pipe must be installed in this state. Because of the space within the engine room, the throttle body is installed higher than the cylinder block and these two elements cannot be connected together by a heat pipe. Also, since since leakage of the operational liquid must be prohibited, the manufacturing cost increases. The present invention was developed in light of these and other drawbacks.

SUMMARY OF THE INVENTION

It is therefore an object of the present invention to provide a suction apparatus for an internal combustion engine which is small, prevents freezing of the throttle body, and reduces the number of parts and the number of assembly steps.

It is another object of the present invention to provide a suction apparatus having a simple structure capable of preventing vibrations.

To achieve these and other objects, the present invention provides a suction apparatus for an internal combustion engine having a vent hole formed in the head cover. A heat conduction portion, provided on the throttle body, is inserted from the external space on the anti combustion chamber side into the vent hole. The heat conduction portion is inserted into the internal space of the head cover that contains a cam for driving the suction valve or exhaust valve. Accordingly, heat within the internal space of the head cover easily conducts to the throttle body and throttle valve. As a result, freezing of the throttle valve is prevented. For example, it is possible to construct the heat conduction portion using a formed metal material having high heat conductivity. Or a resin material may be used which contains such metal material.

In another aspect of the present invention, the heat conduction portion is formed integrally with the throttle body forming therein the suction passage. Since the throttle body serves as the partition wall of the internal space of the head cover, it is possible to directly heat the throttle body with the heat of the internal space of the head cover.

In another aspect of the present invention, the throttle body has the idle speed control portion forming therein the bypass passage bypassing the throttle valve, and the heat conduction portion is provided on this idle speed control portion.

In another aspect of the present invention, since the heat conduction portion is formed into a hollow-cylindrical configuration, the wall portion of the suction passage or bypass passage becomes the partition wall of the internal space of the head.

In another aspect of the present invention, the heat conduction portion is constructed by causing one end of the throttle shaft to protrude outside the throttle body. Since it is possible to construct the heat conduction portion without using new parts, the number of parts is reduced. Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
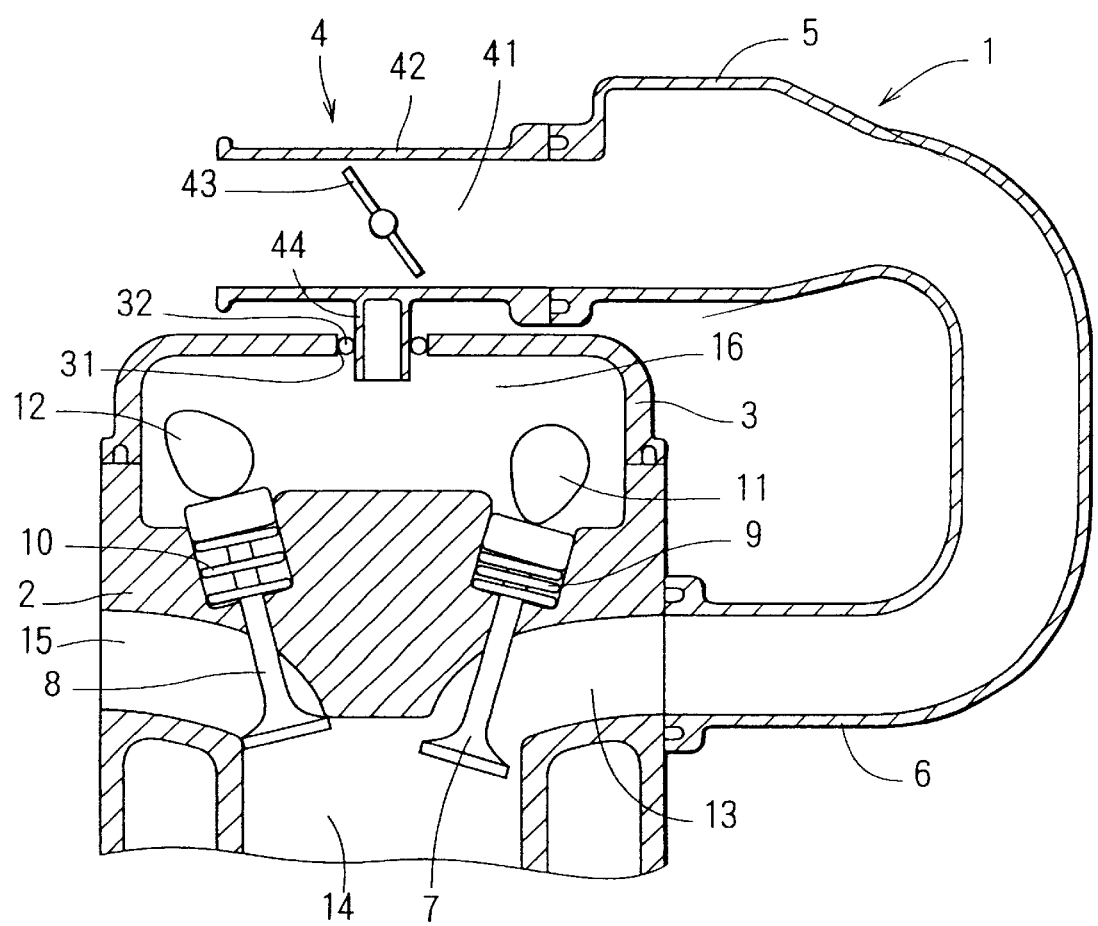
FIG. 1 is a cross-sectional view illustrating a suction apparatus according to a first embodiment of the present invention.
Figure 2:
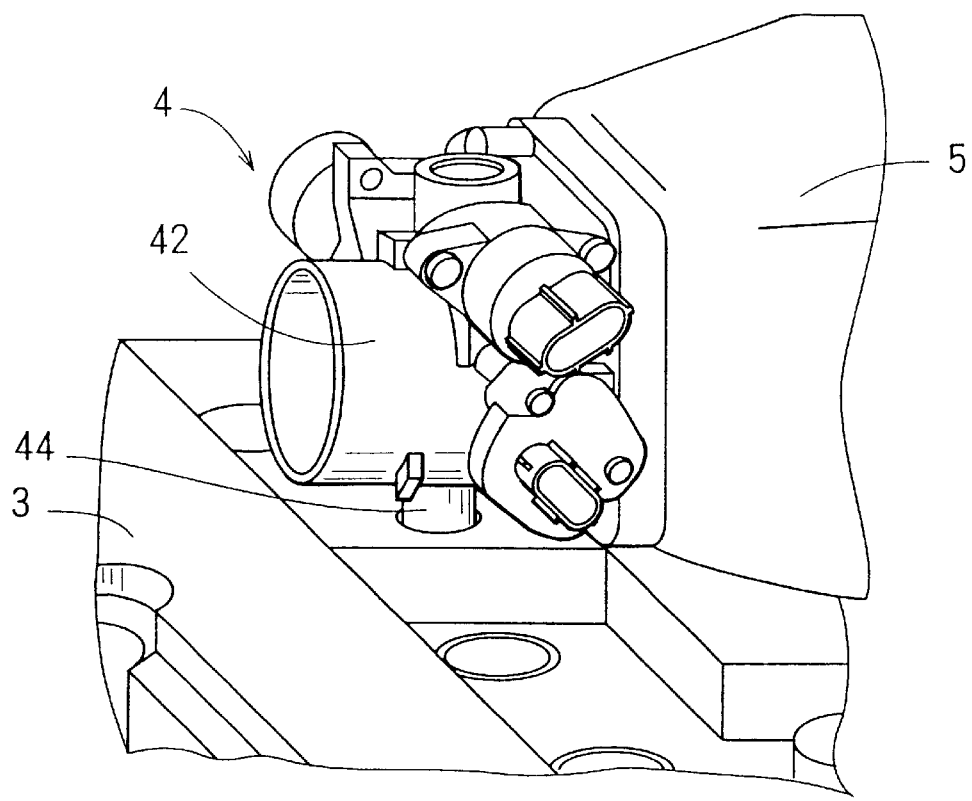
FIG. 2 is a perspective view illustrating the suction apparatus according to the first embodiment of the present invention.
Figure 3:
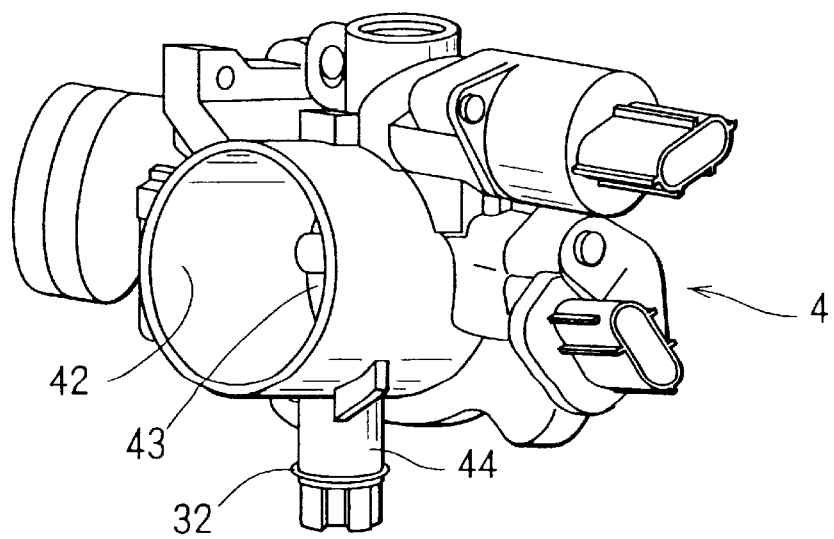
FIG. 3 is a perspective view illustrating a throttle portion of a suction apparatus according to the first embodiment of the present invention.

In FIGS. 1–3, a suction passage 13 and an exhaust passage 15, each communicating with combustion chamber 14, are formed in a cylinder head 2. A suction valve 7 which opens and closes, is provided in the suction passage 13. Exhaust valve 8, which also opens and closes, is provided in the exhaust passage 15. The suction valve 7 and the exhaust valve 8 are urged by springs 9 and 10 to be closed. Suction valve 7 and exhaust valve 8 are reciprocatingly driven by cams 11 and 12, respectively. Cams 11 and 12 are accommodated within an internal space 16 formed inside a head cover 3 that is covered on the cylinder head 2. When the suction valve 7 opens the suction passage 13, air flows from the suction passage 13 into the combustion chamber 14. When the exhaust valve 8 opens the exhaust passage 15, exhaust gas within the combustion chamber 14 is exhausted into the exhaust passage 15.

The suction apparatus 1 comprises a throttle portion 4, and 10 intake manifold 6, and a head cover 3. A throttle portion 4 is connected to an outlet side of an air cleaner not illustrated. The throttle portion 4 has a hollow-cylindrical throttle body 42 forming the suction passage 41, and a throttle valve 43 rotatably supported by the throttle body 42 which adjusts the opening area of suction passage 41. The throttle body 42 has a hollow-cylindrical heat conduction portion 44 which projects outward in the radial direction thereof. Heat conduction portion 44 is formed in direct vicinity of the throttle valve 43. The throttle body 42 and the heat conduction portion 44 are integrally formed with metal material such as aluminum, having excellent heat conductivity, or material containing metal material. The heat conduction portion 44 is not limited to a hollow-cylindrical configuration and may be a not-hollow columnar shape. Preferably, throttle portion 4 is situated near head cover 3. Likewise, heat conduction portion 44 is made as short as possible. Throttle portion 4 has its throttle opening controlled by a control signal from an engine control unit (ECU) (not illustrated) to adjust the amount of air supplied to each cylinder of cylinder head 2.

Head cover 3 is fixed to an upper portion of the cylinder head 2 by means of a bolt, etc. The head cover 3 has a vent hole 31 for communicating the interior thereof with the exterior thereof. Through vent hole 31, heat conduction portion 44 is inserted. The clearance between an outer-peripheral wall thereof and an inner wall of the vent hole 31 is sealed by a seal member 32 that is shaped like a ring.

Next, operation of the suction apparatus 1 will be explained. In operation, the intake air is adjusted in throttle portion 4 by the angle of throttle valve 43, which is angled based on the desired flow rate. This air passes from surge tank 5, through each branch pipe of the intake manifold 6, and is supplied to each cylinder of the cylinder head 2. This air is mixed with fuel injected from a fuel injection device (not illustrated) and is ignited within the combustion chamber 14. Heat from this combustion is conducted to the internal space 16 of the head cover 3 through the cylinder head 2. This heat is conducted to the throttle body 42, which is a wall portion of the suction passage 41, through the heat conduction portion 44.

In the above-explained first embodiment of the present invention, since the heat conduction portion 44 formed integrally with the throttle body 42 is exposed to the internal space 16 of the head cover 3, the heat generated by combustion of the air-fuel mixture is easily conducted to the throttle body 42. Accordingly, freezing of the throttle portion 4 is prevented during low temperatures. Further, since the wall portion of the throttle body 42 proximate heat conduction portion 44 partitions internal space 16 of the head cover 3, it is directly heated by internal space 16. It is possible to enhance the heating effects of the wall portion by making the heat conduction portion 44 sufficiently short. Further, piping is not needed for circulating cooling water through throttle portion 4, and the device is small and has a reduced number of part assembly steps. Also, because the number of parts is small, the weight is light.

Figure 4:
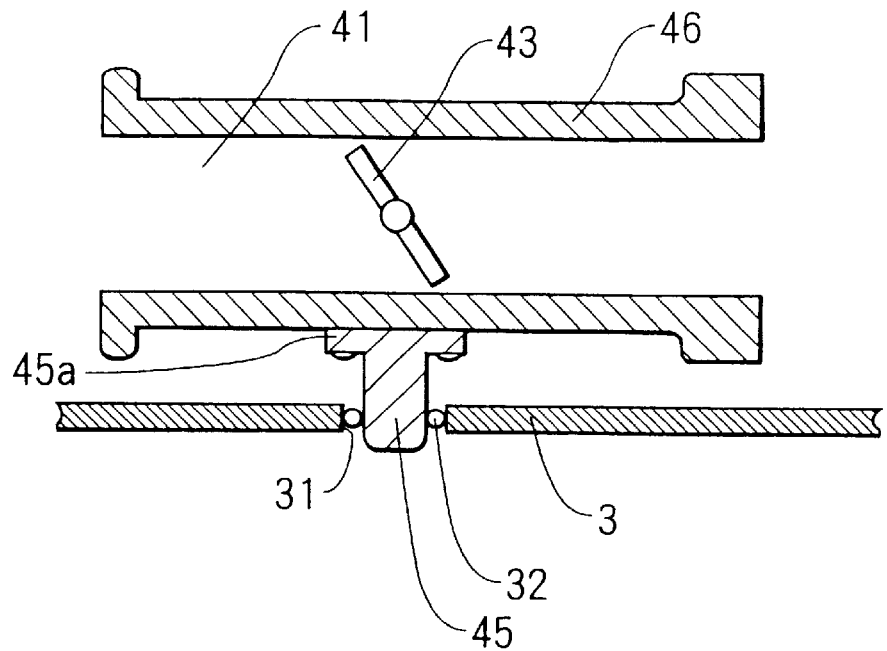
FIG. 4 is a cross-sectional view illustrating a a suction apparatus according to a second embodiment of the present invention.

Next, a second embodiment of the present invention will be explained with reference to FIG. 4. The constituent portions that are substantially the same as those of the first embodiment are denoted by like reference symbols. In the suction apparatus according to the second embodiment, the throttle portion 46 and the heat conduction portion 45 are formed separately from each other. The heat conduction portion 45 is a columnar member having a flange 45a formed at its end portion and is made of metal material such as aluminum having excellent heat conductivity or resin material containing metal. The heat conduction portion 45 has a flange 45a connected to the throttle portion 46 by a bolt, etc. The flange 45a has another end inserted through the vent hole 31 of the head cover 3. Clearance between the outer-peripheral wall thereof and the inner wall of the vent hole 31 is sealed by the ring-like seal member 32.

In the second embodiment of the present invention, since the heat conduction portion 45 directly contacts throttle portion 46 and is exposed into the internal space of the head cover 3, heat generated by combustion of the air-fuel mixture is easily conducted to the throttle portion 46. By making the heat conduction portion 45 sufficiently short, the heating effectiveness of throttle portion 46 is enhanced.

Figure 5:
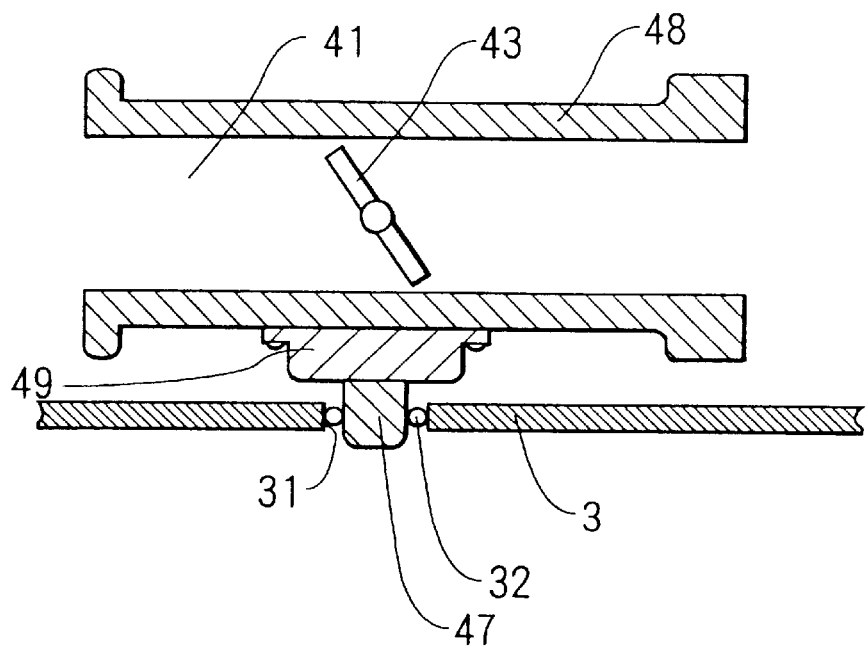
FIG. 5 is a cross-sectional view illustrating a suction apparatus according to a third embodiment of the present invention.

Next, a third embodiment of the present invention will be explained with reference to FIG. 5. The constituent portions that are substantially the same as those of the first embodiment are denoted by like reference symbols. In the suction apparatus according to the third embodiment, an idle speed control portion 49 is provided on the throttle body. The idle speed control portion 49 has a bypass passage (not illustrated) that is open both to an upstream side and to a downstream side of the throttle valve 43 and that bypasses the throttle valve 43 to thereby cause the circulation of air therethrough. In this bypass passage, there is disposed an ISCV (Idle Speed Control Valve). On the idle speed control portion 49, a circular-columnar heat conduction portion 47 is provided. This heat conduction portion 47 may be formed separately from the idle speed control portion 49 or formed integrally with a casing of the idle speed control portion 49. The heat conduction portion 47 is made of metal material such as aluminum having excellent heat conductivity or resin material containing therein such a metal material. The heat conduction portion 47 has its end portion inserted into the vent hole 31 of the head cover 3 and the clearance between the outer-peripheral wall thereof and the inner wall of the vent hole 31 is sealed by the ring-like seal member 32.

In a third embodiment of the present invention, since the heat conduction portion 47 is provided in direct contact with the idle speed control portion 49 and exposed into the internal space of the head cover 3, the heat generated from combustion of the air-fuel mixture is easily conducted to the idle speed control portion 49. By making the heat conduction portion 47 sufficiently short, heating the idle speed control portion 49 is effectively increased. Further, heat conducted to idle speed control portion 49, is conducted to the wall portion 48 20 of the suction passage to heat the throttle valve 43.

Figure 6:
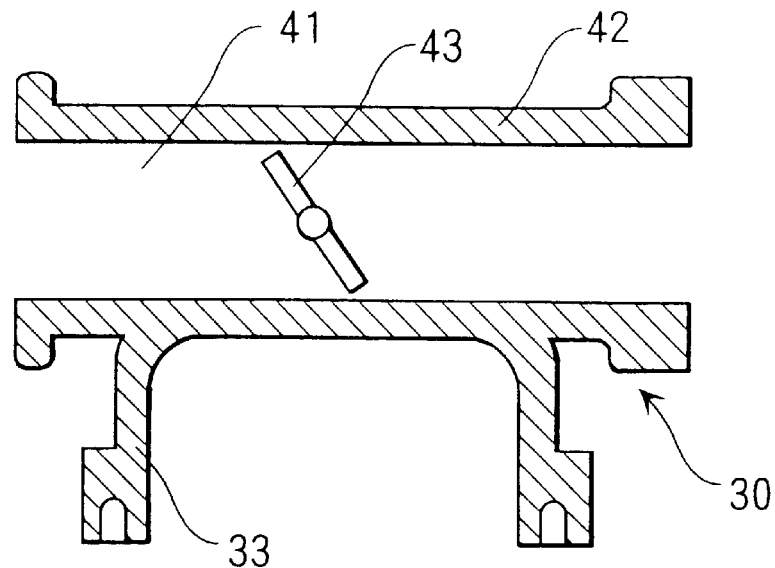
FIG. 6 is a cross-sectional view illustrating a suction apparatus according to a fourth embodiment of the present invention.

Next, a fourth embodiment of the present invention will be explained with reference to FIG. 6. The constituent portions that are substantially the same as those of the first embodiment are denoted by like reference symbols. In the suction apparatus according to the fourth embodiment, throttle body 42 and head cover 33 are formed integrally with each other. A formed structure 30 that has been integrally formed is made of metal material such as aluminum having excellent heat conductivity or resin material containing such a metal material.

In the fourth embodiment of the present invention, since the wall portion of the suction passage 41 is a partition wall for the internal space of the head cover 33, combustion heat from the air-fuel mixture is easily conducted to the suction passage 41. Accordingly, it is possible to prevent freezing of the throttle body 42 during low temperatures, preventing operational defects due to freezing of the throttle valve 43. In addition to the other advantages previously listed, since the throttle body 42 is directly fixed to the cylinder head, vibration of the throttle body 42 is prevented. Accordingly, the throttle valve 43 can be smoothly rotated.

Figure 7:
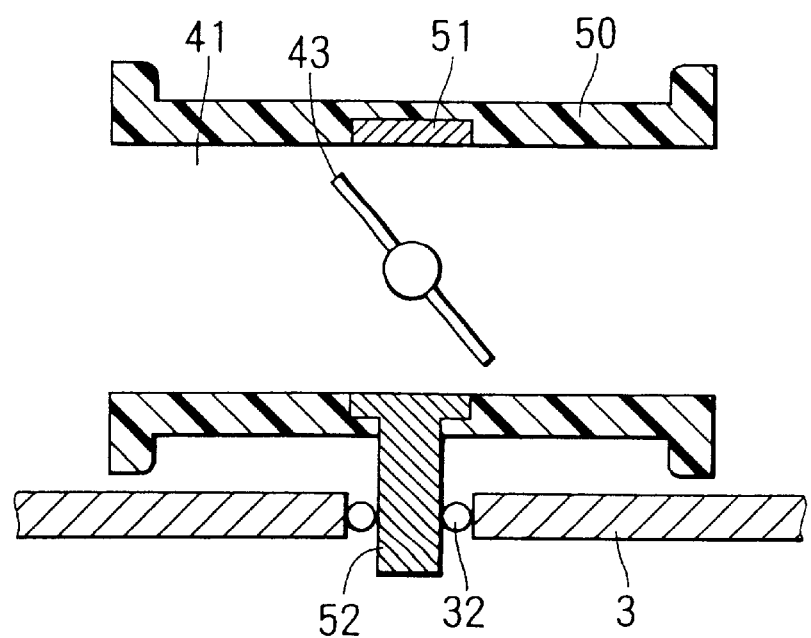
FIG. 7 is a cross-sectional view illustrating a suction apparatus according to a fifth embodiment of the present invention.

Next, a fifth embodiment of the present invention will be explained with reference to FIG. 7. The constituent portions that are substantially the same as those of the first embodiment are denoted by like reference symbols. A throttle body 50 of the fifth embodiment is made of resin. An annular member 51 and a heat conduction portion 52 are each made of metal and are formed integrally with each other. The annular member 51 is an insert formed in the throttle body 50 so as to face the suction passage 41 and surround the outer periphery of the throttle valve 43. The heat conduction portion 52 is inserted into the head cover 3.

Since the throttle body 50 is made of resin, it is possible to make the weight of the suction apparatus light. The heat of the heat conduction portion 52 is not diffused into the throttle body 50 and heat can be conducted to the annular member 51 with a high efficiency. Further, since the annular member 51 and the heat conduction portion 52 are integrally formed, it is possible to reduce the number of parts and the number of assembly steps and to make the suction apparatus light in weight.

Although in the fifth embodiment the annular member 51 and the heat conduction portion 52 are made of metal, the material may be of any quality and is not limited to metal only if such material is higher in heat conductivity than an ordinary resin. For example, such material may be a quality wherein metal powder is mixed into resin.

Figure 8:
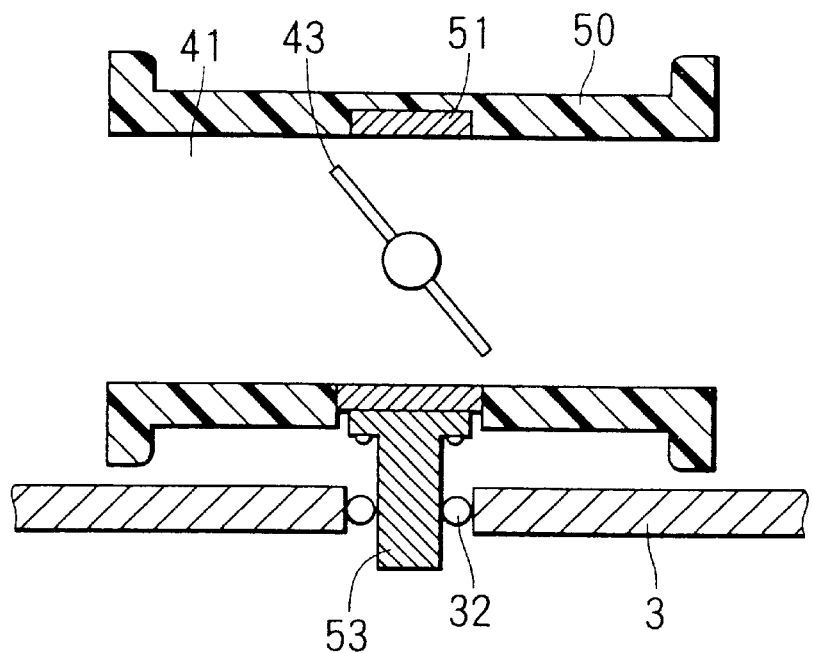
FIG. 8 is a cross-sectional view illustrating a suction apparatus according to a sixth embodiment of the present invention.

Next, a sixth embodiment of the present invention will be explained with reference to FIG. 8. The constituent portions that are substantially the same as those of the fifth embodiment are denoted by like reference symbols. In the sixth embodiment, the annular member 51 and the heat conduction portion 53 are separate members, respectively. Part of the annular member 51 is exposed from the throttle body 50, and this exposed portion and the heat conduction portion 53 are connected to each other. The heat conduction portion 53 is not limited to metal and may be made using any quality of material if such material has a higher heat conductivity than that of an ordinary resin. For example, such material may be a quality wherein metal powder is mixed into resin.

Figure 9:
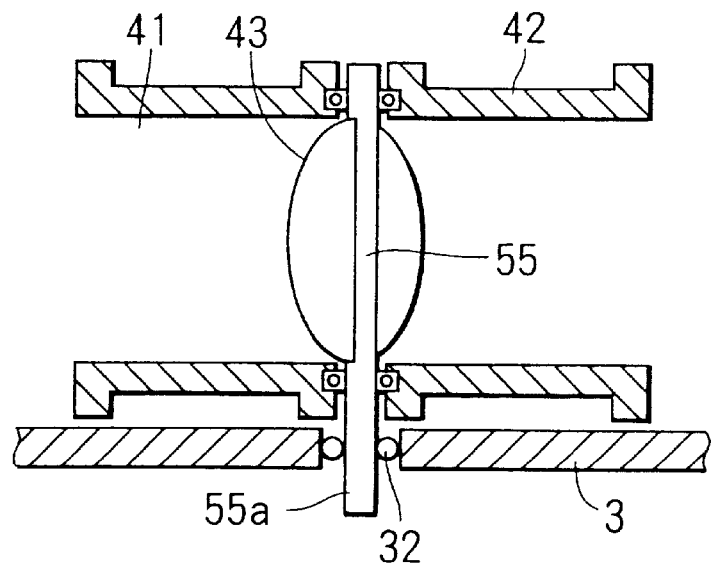
FIG. 9 is a cross-sectional view illustrating a suction apparatus according to a seventh embodiment of the present invention.

Next, a seventh embodiment of the present invention will be explained with reference to FIG. 9. The constituent portions that are substantially the same as those of the first embodiment are denoted by like reference symbols. A throttle shaft 55 has fitted thereon a throttle valve 43 and is rotatably supported by the throttle body 42. An end portion 55a in the axial direction of the throttle shaft 55 projects outside the throttle body 42 and is inserted into the head cover 3. The clearance between the throttle shaft 55 and the head cover 3 is sealed using the seal member 32 that is shaped like a ring. By using an O-ring or a ball bearing as the seal member 32, engine oil does not diffuse from within the head cover 3 to outside the head cover 3 while keeping the slide resistance of the throttle shaft 55 at a small value.

In the seventh embodiment, since the end portion 55a of the throttle shaft 55 constitutes the heat conduction portion, the number of parts, number of assembly steps and the weight of the suction apparatus is reduced. Preferably, throttle shaft 55 is formed of material such as SIOC that has high heat conductivity and high strength. However, resin may also be used. Also, the throttle valve 43 may be made of brass, having a high heat conductivity and high strength. Also, the throttle body 42 may be made of either metal or resin.

Figure 10:
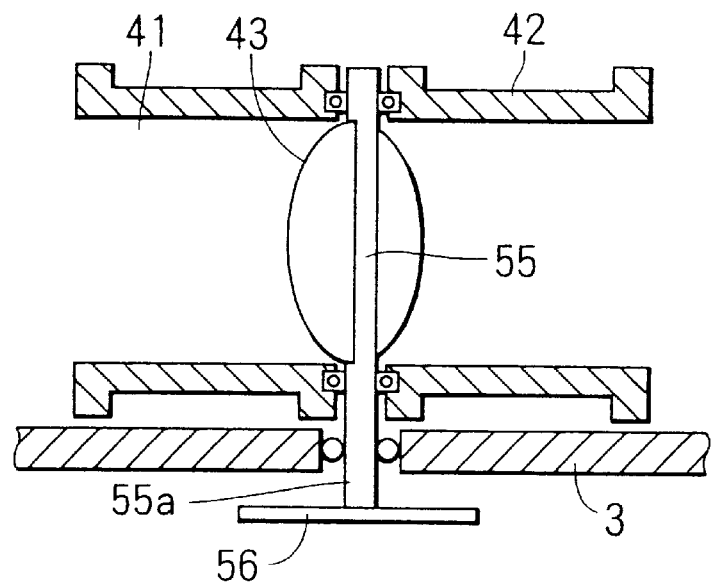
FIG. 10 is a cross-sectional view illustrating a suction apparatus according to an eighth embodiment of the present invention.

Next, an eighth embodiment of the present invention will be explained with reference to FIG. 10. The constituent portions that are substantially the same as those of the seventh embodiment are denoted by like reference symbols. The end portion 55a of the throttle shaft 55 projects outside throttle body 42 and is inserted into the head cover 3. A circular plate portion 56 serving as a surface-enlarging portion is connected to the end portion 55a and is disposed within the head cover 3.

Since the surface area of the circular plate portion 56 disposed within the head cover 3 is large, a large amount of heat is conducted to the suction apparatus. Accordingly, the rise in temperature of the throttle valve 43 and throttle body 42 is expedited, thereby enabling the prevention of icing.

Figure 11:
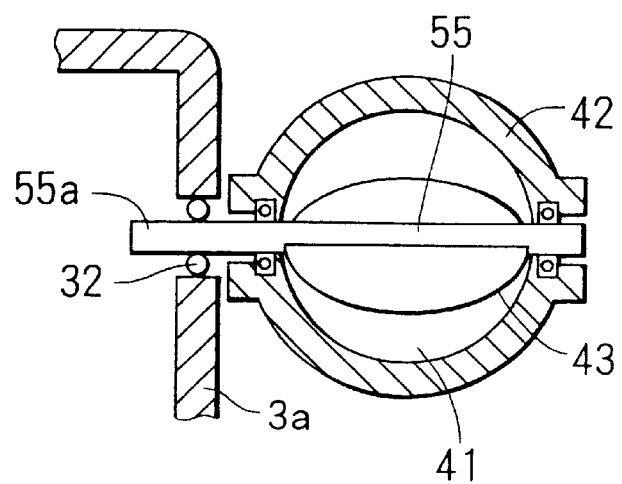
FIG. 11 is a cross-sectional view illustrating a suction apparatus according to a ninth embodiment of the present invention.

Next, a ninth embodiment of the present invention will be explained with reference to FIG. 11. The constituent portions that are substantially the same as those of the seventh embodiment are denoted by like reference symbols. The end portion 55a of the throttle shaft 55 projects outside the throttle body 42 and is inserted into a side wall 3a thereof. It is noted that the throttle shaft 55 may be inserted into any given position of the head cover 3.

Figure 12:
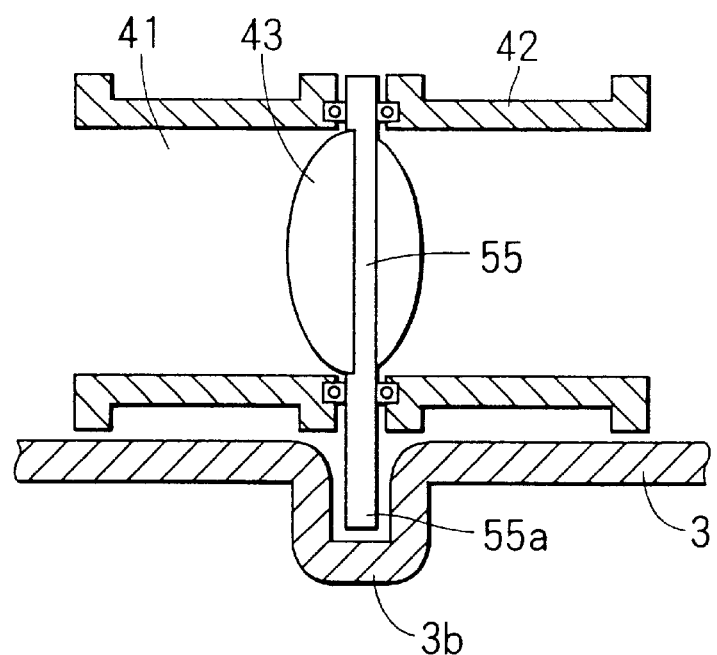
FIG. 12 is a cross-sectional view illustrating a suction apparatus according to a tenth embodiment of the present invention.

Next, a tenth embodiment of the present invention will be explained with reference to FIG. 12. The constituent portions that are substantially the same as those of the seventh embodiment are denoted by like reference symbols. The head cover 3 has a concavity portion 3b, and the end portion 55a of the throttle shaft 55 is fit into the concavity portion 3b. Since the clearance between the head cover 3 and the throttle shaft 55 is not needed for sealing, the number of parts is reduced and the number of assembling steps of the suction apparatus is reduced. The end portion 55a of the throttle shaft 55 may either contact or not contact head cover 3. Alternatively, it may be sufficient that the end portion 55a only be situated near the head cover 3.

Figure 13:
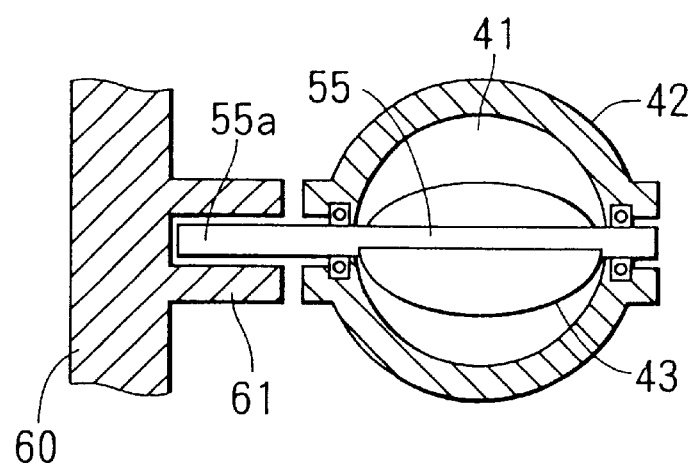
FIG. 13 is a cross-sectional view illustrating a suction apparatus according to an eleventh embodiment of the present invention.

Next, an eleventh embodiment of the present invention will be explained with reference to FIG. 13. The constituent portions that are substantially the same as those of the seventh embodiment are denoted by like reference symbols. A circular-hollow-cylindrical protruding portion 61 is integrally formed on an outer-peripheral wall of a cylinder block 60. The end portion 55a of the throttle shaft 55 is fit into the protruding portion 61. The protruding portion 61 may be a member separate from the cylinder block 60. The protruding portion need not be formed on the cylinder block 60 and may be formed on the cylinder head or head cover. The cylinder block 60, the cylinder head, and the head cover constitute the engine block. While the above-described embodiments refer to examples of usage of the present invention, it is understood that the present invention may be applied to other usage, modifications and variations of the same, and is not limited to the disclosure provided herein.

What is claimed is:

1. A suction apparatus provided on a cylinder head of an internal combustion engine, comprising:
    a head cover having an internal space accommodating a cam that driving a suction valve or an exhaust valve of an internal combustion engine, said head cover having a vent hole, said internal space communicating with an external space through said vent hole;
    a throttle body having a suction passage which communicates with a combustion chamber of said internal combustion engine;
    a throttle valve which meters air flow through said throttle body and to said combustion chamber; and
    a heat conduction portion provided on said throttle body which extends from said external space into said vent hole.

2. A suction apparatus as claimed in claim 1, wherein:
    said heat conduction portion is integrally formed with said throttle body.

3. A suction apparatus as claimed in claim 1, wherein:
    said throttle body has an idle speed control portion formed in a bypass passage that bypasses said throttle valve; and
    said heat conduction portion is provided in said idle speed control portion.

4. A suction apparatus as claimed in claim 3, wherein:
    said heat conduction portion is formed integrally with a wall portion of said bypass passage.

5. A suction apparatus as claimed in claim 1, wherein:
    said heat conduction portion is shaped as a hollow cylinder.

6. A suction apparatus provided on a cylinder head of an internal combustion engine, said internal combustion engine having a suction valve or an exhaust valve, said suction apparatus comprising:
    a unitary, integrally formed structure defining a head cover for forming an internal space which accommodates a cam for driving said suction valve or exhaust valve, said unitary, integrally formed structure further defining a throttle body having a suction passage and a throttle valve mounted thereto for adjusting drawn air, wherein a portion of a wall of said head cover also defines a portion of a wall of said throttle body whereby adjacent said wall portions said internal space and said suction passage are separated by a single, solid wall of said unitary, integrally formed structure.

7. The suction apparatus provided on a cylinder head of an internal combustion engine according to claim 6, wherein said single, solid wall facilitates heat transfer from said internal space of said head cover to said throttle body and said throttle valve.

8. A suction apparatus for an internal combustion engine, the suction apparatus adjusting a flow rate of sucked air flowing through a suction passage, the suction apparatus comprising:
    a throttle body forming said suction passage and having a hole defined through a wall thereof;
    a throttle shaft rotatably supported by said throttle body;
    a throttle valve mounted on said throttle shaft and adjusting the flow rate of drawn air flowing through said suction passage; and
    a heat conduction portion protruding to outside said throttle body through said hole and conducting heat to said suction apparatus,
        wherein said heat conduction portion is one end portion of said throttle shaft, which protrudes through said hole and receives heat through contact with, or by being disposed proximate to, an outer-peripheral surface of an engine housing.

9. A suction apparatus for an internal combustion engine, the suction apparatus adjusting a flow rate of sucked air flowing through a suction passage, the suction apparatus comprising:
    a throttle body forming said suction passage;
    a throttle shaft rotatably supported by said throttle body;
    a throttle valve mounted on said throttle shaft and adjusting the flow rate of drawn air flowing through said suction passage; and
    a heat conduction portion protruding to outside said throttle body and conducting heat to said suction apparatus, wherein:
        said throttle body is made of resin;
        a metal ring is attached to said throttle body, which surrounds an outer periphery of said throttle valve; and
        said heat conduction portion protrudes from said metal ring to outside said throttle body.

10. A suction apparatus for an internal combustion engine, the suction apparatus adjusting a flow rate of sucked air flowing through a suction passage, the suction apparatus comprising:
    a throttle body forming said suction passage;
    a throttle shaft rotatably supported by said throttle body;
    a throttle valve mounted on said throttle shaft and adjusting the flow rate of drawn air flowing through said suction passage; and
    a heat conduction portion protruding to outside said throttle body and conducting heat to said suction apparatus, wherein:
        said heat conduction portion has a surface-enlarging portion at its end portion on a side opposite to a side on which said throttle body is situated.

11. A suction apparatus for an internal combustion engine, the suction apparatus adjusting a flow rate of sucked air flowing through a suction passage, the suction apparatus comprising:
- a throttle body forming said suction passage;
- a throttle shaft rotatably supported by said throttle body;
- a throttle valve mounted on said throttle shaft and adjusting the flow rate of drawn air flowing through said suction passage; and
- a heat conduction portion protruding to outside said throttle body and conducting heat to said suction apparatus, wherein:
  said heat conduction portion is inserted into the cover of the cylinder head.

* * * * *